United States Patent [19]

Weaver et al.

[11] Patent Number: 4,495,204

[45] Date of Patent: Jan. 22, 1985

[54] NEUTRAL TASTING ALCOHOLIC BEVERAGE

[75] Inventors: Robert L. Weaver, Montreal West; Joris E. A. Van Gheluwe, Longueuil; John A. McKee, Greenfield Park, all of Canada

[73] Assignee: The Molson Companies Limited, Ontarion, Canada

[21] Appl. No.: 517,800

[22] Filed: Jul. 27, 1983

[30] Foreign Application Priority Data

Aug. 9, 1982 [CA] Canada ............................. 409030

[51] Int. Cl.³ ..................... C12C 11/04; C12G 3/00
[52] U.S. Cl. .................................. 426/16; 426/29; 426/592
[58] Field of Search ............. 426/11, 13, 16, 29, 426/477, 592

[56] References Cited

U.S. PATENT DOCUMENTS 3,332,779  7/1967  Krabbe et al. ................ 426/16
3,798,331  3/1974  Bavisotto et al. ............. 426/11
3,908,021  9/1975  Rehberger et al. ............ 426/11
4,021,580  5/1977  Raymond et al. ............. 426/16

Primary Examiner—Robert Yoncoskie
Assistant Examiner—Marianne S. Minnick
Attorney, Agent, or Firm—Anthony J. Casella; Gerald E. Hespos

[57] ABSTRACT

A neutral tasting alcoholic beverage prepared by mashing a well modified standard brewers malt, with hops and water at a temperature of 40° C. to 45° C. for a period of time of between 10 to 30 minutes, and thereafter raising the temperature to from 60° C. to 62° C. to obtain a wort. The wort, in an amount of from 2% to 20%, is mixed with a fermentable carbohydrate and water at a temperature of between 80° C. and 90° C. in an amount of from 80% to 98%, to obtain a fermentable solution, which is then cooled to between 14° C. to 20° C., and pitched with brewers yeast. It is then fermented for from 4 to 8 days at from 14° C. to 20° C. and thereafter cooled to 0° C. for from 4 to 7 days, and filtered to obtain the neutral tasting alcoholic beverage.

16 Claims, No Drawings

NEUTRAL TASTING ALCOHOLIC BEVERAGE

The present invention relates to the production of a neutral tasting alcoholic beverage, and discloses a method of producing same utilizing a hopped wort of the type usually used to brew beer.

Production of a neutral tasting alcoholic beverage, utilizing a hopped wort has been described in Canadian Pat. No. 1,034,064, granted July 4, 1978 to Rehberger et al. The process described by Rehberger utilizes, as a starting material, a low kiln malt with a soluble protein content of between 30% and 37% by weight, a moisture content of 5% to 6% and a diastase value of 150 to 240. This low kiln malt is then mixed with water at between 66° and 77°, to form a mash and maintained in that temperature range to produce a wort. The thereby produced wort is then boiled for 10–40 minutes, mixed with a carbohydrate adjunct and a supplementary nitrogen source and fermented with brewers yeast. The resultant fermented substrate is, according to Rehberger, suitable for treatments with various flavouring extracts, but unsuitable for pasteurization.

The principal disadvantage associated with the process taught by Rehberger lies in the use of a low kiln malt as opposed to a modified brewers malt. This type of malt (low kiln) exhibits soluble protein in the range of only 30% to 37%, and must therefore be supplemented with a nitrogen source in large quantities (up to 500 ppm of ammonium phosphate).

Furthermore, the mashing temperature of a low kiln malt is from 66° to 77°, well above the optimal temperature for fermentable sugar formation of 62°.

The use of low kiln malt is also disadvantageous in that colour and taste are also adversely affected in the final product.

It is the object of the present invention to overcome the above disadvantages, and to provide a method of producing a neutral tasting alcoholic beverage utilizing as a starting material, a hopped wort made from a mash of a standard well modified brewers malt.

The present invention therefore provides a method of producing a neutral tasting alcoholic beverage comprising the steps of:

(i) mashing a well modified standard brewers malt, with hops and water at a temperature of 40° to 45° for a period of time of between 10 to 30 minutes, and thereafter raising the temperature of from 60° to 62° to obtain a wort;

(ii) mixing the thereby obtained wort in an amount of from 2% to 20% with a fermentable carbohydrate and water at a temperature of between 80° and 90° in an amount of from 80% to 98%, to obtain a fermentable solution;

(iii) cooling the thereby obtained solution to between 14° and 20°, pitching the cooled solution with brewers yeast and fermenting the solution for from 4 to 8 days at from 14° to 20°, and (iv) thereafter cooling the fermented solution to 0° C. form from 4 to 7 days, and filtering the solution to obtain a neutral tasting alcoholic beverage.

The beverage obtained through the above process may be carbonated, and/or flavoured with natural grape juice to obtain a beverage which, unlike those beverages disclosed in the prior art, may be further subjected to pasteurization to obtain a natural tasting and well purified wine substitute.

If desired, and according to the amino acid content of the well modified brewers malt being used in the process of the present invention, ammonium phosphate may be used to supplement the nitrogen of the malt.

The present invention may be illustrated by the following examples:

EXAMPLE 1

A wort was produced by mashing a well modified standard brewers malt and hops with sufficient water at a temperature of 40° to 45° for 20 minutes and then raising the temperature to 60° to 62° to obtain a wort at a gravity of 15.2° P. Six liters of the wort were mixed with 3766 grams of dextrose sugar and hot (85°) filtered water to a gravity of 17.2° P. and a volume of 26 litres. The solution was then allowed to stand at a temperature of 65° to 70° for 30 minutes, to reduce the risk of infection.

The solution was then cooled to 18° C., aerated and pitched with $18 \times 10^6$/ml brewers yeast (saccharomyces cerevisiae or saccharomyces uvarum are suitable) and allowed to ferment for 7 days at 20° C.

At the end of the 7 days the solution was cooled to 0°, stored for 7 days, primary filtered, stored at 0° for 7 more days, polished filtered, carbonated by conventional methods and pasturized.

An alcoholic beverage with a neutral taste and a desirable pale champagne colour was thereby obtained as a resultant product.

EXAMPLE 2

A procedure similar to that of Example 1 was followed, but 1.8 liters of red grape juice at 16° P. were added to the solution prior to fermentation.

The resultant beverage was similar to a dry sparkling red wine, but with a composition of 17.1% wort extract, 68.4% dextrose sugar and 14.5% red grape juice extract.

EXAMPLE 3

The procedure used in making of this beverage was the same as for Example 1 except that 89.5 grams of sucrose sugar was added to the base after fermentation.

The resultant beverage was slightly sweet tasting and similar in appearance to a sparkling white wine.

EXAMPLE 4

The procedure used in making of this beverage was the same as for Example 1 except that it was not carbonated.

EXAMPLE 5

The procedure used in making of this beverage was the same as for Example 1 except that 1.8 liters of red grape juice (as for Example 2) were added to the solution before fermentation and 89.5 grams of sucrose sugar were added after fermentation.

The resulting beverage was similar in taste and appearance to a sparkling dessert rosé.

EXAMPLE 6

The procedure used in the making of this beverage was the same as for Example 1 except that 89.5 grams of sucrose sugar and 260 ml of red grape juice were added after fermentation.

The resultant beverage was similar to that produced in Example 2, above.

It is therefore seen that in the present invention, a wine-like beverage is produced utilizing standard brewing ingredients and natural flavourings.

The use of natural flavourings is highly desirable as the resultant beverage may be pasteurized and is less expensive to produce than beverages employing artificial flavourings.

As well, the use of a well modified brewers malt, which is mashed at the optimal temperature for fermentable sugar formation allows the process of the present invention to utilize a maximum quantity of naturally occurring sugars, with increased energy efficiency due to a lower mashing temperature.

The embodiments of the invention in which an exclusive property or privilege is claimed are defined as follows:

1. A method of producing a neutral tasting alcoholic beverage comprising the steps of:
   (i) mashing a well modified standard brewers malt, with hops and water at a temperature of 40° C. to 45° C. for a period of time of between 10 to 30 minutes, and thereafter raising the temperature to from 60° C. to 62° C. to obtain a wort;
   (ii) mixing the thereby obtained wort in an amount of from 2% to 20% with a fermentable carbohydrate and water at a temperature of between 80° C. and 90° C. in an amount of from 80% to 98%, to obtain a fermentable solution;
   (iii) cooling the thereby obtained solution to between 14° C. to 20° C., pitching the cooled solution with brewers yeast and fermenting the solution for from 4 to 8 days at from 14° C. to 20° C., and
   (iv) thereafter cooling the fermented solution to 0° C. for from 4 to 7 days, and filtering the solution to obtain a neutral tasting alcoholic beverage.

2. A method as claimed in claim 1, wherein in step ii, the amount of said wort is from 15% to 20%, and the temperature of said water is 85° C.

3. A method as claimed in claim 2 wherein, in step iii, the said solution is cooled to 18° C. and thereafter fermented at 20° C.

4. A method as claimed in claim 1, 2 or 3 including the further step of adding natural grape juice in an amount of from 2% to 20% by volume to the said solution prior to fermentation, and pasteurizing the said solution after filtering.

5. A method as claimed in claim 1, 2 or 3 including the further step of adding sucrose sugar to the said solution after fermentation.

6. A method as claimed in claim 1, 2 or 3 including the further step of carbonating the said solution after fermentation.

7. A method as claimed in claim 1, 2 or 3 including the further steps of adding natural grape juice to the solution prior to fermentation, and sucrose sugar to the said solution after fermentation, and pasteurizing the said solution after filtering.

8. A method as claimed in claim 1, 2 or 3 including the further steps of adding natural grape juice and sucrose sugar to the said solution prior to fermentation, and pasteurizing the said solution after filtering.

9. A neutral tasting alcoholic beverage produced by the method of claim 1.

10. A neutral tastinq alcoholic beverage produced by the method of claim 2.

11. A neutral tasting alcoholic beverage produced by the method of claim 3.

12. A neutral tasting alcoholic beverage produced by the method of claim 9, 10 or 11, wherein the said method includes the further step of adding natural grape juice to the said solution prior to fermentation, and pasteurizing the said solution after filtering.

13. A neutral tasting alcoholic beverage produced by the method of claim 9, 10 or 11 wherein the said method includes the further step of adding sucrose sugar to the said solution after fermentation.

14. A neutral tasting alcoholic beverage produced by the method of claim 9, 10 or 11, wherein the said method includes the further step of carbonating the said solution after fermentation.

15. A neutral tasting alcoholic beverage produced by the method of claim 9, 10 or 11, wherein the said method includes the further steps of adding natural grape juice to the solution prior to fermentation and sucrose sugar to the said solution after fermentation, and pasteurizing the said solution after filtering.

16. A neutral tasting alcoholic beverage produced by the method of claim 9, 10 or 11, wherein the said method includes the further steps of adding natural grape juice and sucrose sugar to the said solution prior to fermentation, and pasteurizing the said solution after filtering.

* * * * *